United States Patent
Casalegno et al.

(10) Patent No.: US 11,264,620 B2
(45) Date of Patent: Mar. 1, 2022

(54) LOCALLY ENGINEERED PEM CELLS COMPONENTS WITH OPTIMIZED OPERATION FOR IMPROVED DURABILITY

(71) Applicant: POLITECNICO DI MILANO, Milan (IT)

(72) Inventors: Andrea Casalegno, Milan (IT); Claudio Rabissi, Milan (IT); Laila Grahl-Madsen, Milan (IT)

(73) Assignee: POLITECNICO DI MILANO, Milan (IT)

( * ) Notice: Subject to any disclaimer, the term of this patent is extended or adjusted under 35 U.S.C. 154(b) by 149 days.

(21) Appl. No.: 16/623,221

(22) PCT Filed: Jun. 19, 2017

(86) PCT No.: PCT/IT2017/000120
§ 371 (c)(1),
(2) Date: Dec. 16, 2019

(87) PCT Pub. No.: WO2018/235108
PCT Pub. Date: Dec. 27, 2018

(65) Prior Publication Data
US 2020/0403249 A1  Dec. 24, 2020

(51) Int. Cl.
*H01M 4/86* (2006.01)
*H01M 4/92* (2006.01)
(Continued)

(52) U.S. Cl.
CPC .......... *H01M 4/8642* (2013.01); *H01M 4/92* (2013.01); *H01M 8/023* (2013.01); *H01M 8/045* (2013.01);
(Continued)

(58) Field of Classification Search
CPC ...... H01M 4/8642; H01M 4/92; H01M 8/023; H01M 8/04358; H01M 8/04388;
(Continued)

(56) References Cited

U.S. PATENT DOCUMENTS

2005/0123813 A1*  6/2005  Matoba ............. H01M 8/04007
                                                                429/415
2011/0008705 A1*  1/2011  Zheng ................... H01M 4/926
                                                                429/480
(Continued)

FOREIGN PATENT DOCUMENTS

EP  1 229 600 A1  8/2002
EP  1 691 438 A1  8/2006

OTHER PUBLICATIONS

Phillips et al. Utilizing a segmented fuel cell to study the effects oof electrode coating irregularities on PEM fuel cell initial performance. Fuel Cells, vol. 17, Issue 3, 2017, pp. 288-298. Retrieved online from <URL: https://onlinelibrary.wiley.com/doi/10.1002/fuce.201600214> (Year: 2017).*

(Continued)

*Primary Examiner* — James M Erwin
(74) *Attorney, Agent, or Firm* — Troutman Pepper Hamilton Sanders LLP (57) ABSTRACT

A PEM fuel or electrolysis cell with an extended lifetime, improved performance and uniform and stable operation is disclosed wherein a membrane electrode assembly is provided with a gradient of one or more properties in combination with a modification of one or more control parameters of the cell during its operation.

13 Claims, 11 Drawing Sheets

(51) Int. Cl.
*H01M 8/023* (2016.01)
*H01M 8/0432* (2016.01)
*H01M 8/0438* (2016.01)
*H01M 8/04492* (2016.01)
*H01M 8/10* (2016.01)

(52) U.S. Cl.
CPC ... *H01M 8/04358* (2013.01); *H01M 8/04388* (2013.01); *H01M 8/04395* (2013.01); *H01M 8/04417* (2013.01); *H01M 8/04507* (2013.01); *H01M 2008/1095* (2013.01)

(58) Field of Classification Search
CPC ......... H01M 8/04395; H01M 8/04417; H01M 8/045; H01M 8/04507
USPC ........................................................ 429/492
See application file for complete search history.

(56) References Cited

U.S. PATENT DOCUMENTS

| | | |
|---|---|---|
| 2012/0082917 A1 | 4/2012 | Sinha et al. |
| 2012/0282537 A1 | 11/2012 | Ohma et al. |
| 2016/0064755 A1* | 3/2016 | Hubner ............... H01M 4/8657 429/413 |
| 2016/0218382 A1* | 7/2016 | Bigarre ............. H01M 8/04932 |

OTHER PUBLICATIONS

International Search Report issued in corresponding International Patent Application No. PCT/IT2017/000120 dated Nov. 16, 2017.

* cited by examiner

LOCALLY ENGINEERED PEM CELLS COMPONENTS WITH OPTIMIZED OPERATION FOR IMPROVED DURABILITY

CROSS REFERENCE TO RELATED APPLICATION

This is a U.S. National Phase Application under 35 U.S.C. § 371 of International Patent Application No. PCT/IT2017/000120, filed Jun. 19, 2017. The entire contents of which are hereby incorporated by reference.

FIELD OF THE INVENTION

The present invention relates to a long lasting PEM fuel or electrolysis cell.

BACKGROUND

A fuel cell is an electrochemical energy converter that converts chemical energy of fuel directly into direct current (DC) electricity.

A fuel cell has an electrolyte and negative and positive electrodes, and it generates DC electricity through electrochemical reactions.

A fuel cell is supplied with reactants and oxidants. Typical reactants for fuel cells are hydrogen and oxygen; however, neither has to be in its pure form. Hydrogen may be present either in a mixture with other gases (such as $CO_2$, $N_2$, and CO) or in hydrocarbons such as natural gas, $CH_4$, or even in liquid hydrocarbons such as methanol, CH3OH. Ambient air contains enough oxygen to be used in fuel cells.

A fuel cell generates as waste heat and water.

SUMMARY

Polymer electrolyte membrane or proton exchange membrane fuel cells (PEMFCs) use a thin (<50μη) proton conductive polymeric membrane (such as perfluorosulfonated acid polymer, later on also named as ionomer) as the electrolyte. The catalyst is typically platinum or its alloys supported on carbon with loadings of about 0.3 mg/cm², if the hydrogen feed contains minute amounts of CO, Pt—Ru alloys are used. Operating temperature is typically between 60° C. and 80° C. The average temperature value and temperature distribution over cell surface are controlled by a suitable cooling system, typically based on a cooling circuit fed by an inert, non-conductive liquid coolant. PEM fuel cells, assembled in stack to reach the required electrical power, are serious candidates for automotive applications as well as small-scale distributed stationary power generation and for portable power applications.

A direct methanol fuel cell (DMFC) is essentially a polymer membrane fuel cell that uses a liquid methanol-water mixture instead of hydrogen as a fuel.

At the heart of a PEM fuel cell is a polymer membrane that has some unique capabilities, being impermeable to gases but able to selectively conduct protons. The membrane that acts as the electrolyte is squeezed between the two porous, electrically conductive electrodes, each of them composed of a catalyst layer, typically including catalyst nanoparticles supported on carbon and ionomer, and a gas diffusion layer, typically made of carbon cloth or carbon paper. Electrochemical reactions happen at the surface of the catalyst. Hydrogen, which is fed on one side of the membrane, is oxidized into its primary constituents protons and electrons. Protons migrate through the membrane, whereas the electrons migrate through electrically conductive electrodes, through current collectors, and through the outside circuit reaching the opposite side of the membrane. Here, at the catalyst sites they finally react with the protons, that crossed through the membrane, and oxygen, that is fed on that side of the membrane. Water is generated in the electrochemical oxygen reduction reaction and then pushed out of the cell with the flow of nitrogen and remaining oxygen.

The net result of these simultaneous reactions is a direct current of electrons through the external circuit, that represents the useful work of the fuel cell.

PEM electrolyser or electrolysis cell are devices very similar to PEM fuel cell, constituted by the same components, some of them made of different materials, where the operation is reversed: electrical energy is supplied to the device, water is supplied and is split into hydrogen and oxygen that are produced through respectively the electrochemical reactions of hydrogen and oxygen evolution. Conventionally, anode and cathode electrodes are defined as the electrodes where respectively oxidation and reduction reactions take place.

Thus, in PEM fuel cell the negative electrode at the hydrogen side is the anode, whereas the positive electrode at the oxygen side of the fuel cell is the cathode.

In PEM electrolysis cell case, instead, the negative electrode at the hydrogen side is the cathode, whereas the positive electrode at the oxygen side of the electrolysis cell is the anode.

The term PEM cell is used later on to refer to both PEM fuel cell and PEM electrolysis cell. Performance provided by a PEM cell is known to be heterogeneously distributed over the cell active surface; such an uneven distribution tends to evolve during cell's operation, generally determining a shrinking of the mostly active domain in terms of current density, increasing the inhomogeneity of local operating conditions. This phenomenon determines strong local differences in operating efforts and conditions that, cumulated over long term operation, lead to a locally uneven aging of the components: the components' most stressed area will age earlier, limiting lifetime for the overall device.

Current density distribution over cell's active area is the result of a complex interaction between several performance driving parameters such as distributors' geometry, partial pressure of both reactants and products and their cross-over, water presence and consequent hydration status of the components, local temperature, that determine local inhomogeneity in operating conditions. Even though local operating conditions are inhomogeneous, cell's components are usually developed with uniform properties, averagely optimized over the whole active area of the cell, resulting in the non-optimized operation for most of the cell surface itself. Operating locally in not optimized conditions could determine an acceleration of aging mechanisms, leading to lower performance, less stability and shorter lifetime.

The task of the present invention is to provide a PEM fuel or electrolysis cell which eliminates the aforementioned technical drawbacks of the prior art.

Within the scope of this task, one object of the invention is to provide a PEM cell with an extended lifetime.

Another object of the invention is to provide a PEM cell with improved performance and uniform and stable operation.

This task, as well as these and other objects, are achieved by a PEM cell comprising at least a reactant supply, an oxidant supply, a coolant supply and a membrane electrode assembly, said membrane electrode assembly comprising an electrolyte membrane coated with an anode side and a cathode side catalyst layer, and anode side and cathode side gas diffusion layer each coating the respective catalyst layer, characterized in that said membrane electrode assembly is provided with a gradient of at least one property of at least a component thereof, and in that tuning means are provided modifying at least one control parameter of the cell during operation of the cell.

In an embodiment of the invention said component is a catalyst layer.

In an embodiment of the invention said gradient is a gradient of catalyst loading per unit of surface of at least one catalyst layer.

In an embodiment of the invention said gradient is a gradient of ionomer loading per unit of surface of at least one catalyst layer.

In an embodiment of the invention said gradient is a gradient of thickness of at least one catalyst layer.

In an embodiment of the invention said gradient has a parabolic trend.

In an embodiment of the invention said component is a gas diffusion layer.

In an embodiment of the invention said gradient is a gradient of hydrophobicity of at least one gas diffusion layer.

In an embodiment of the invention said component is an anode side component.

In an embodiment of the invention said component is a cathode side component.

Of course one, more or each component of the membrane electrode assembly may have a gradient of one or more of its properties.

In an embodiment of the invention said control parameter is the flow rate, temperature, relative humidity or pressure of the reactant.

In an embodiment of the invention said control parameter is the flow rate, temperature, relative humidity or pressure of the oxidant.

In an embodiment of the invention said flow rate is gradually increased during operation of the cell.

In an embodiment of the invention said control parameter is the average working temperature of the cell.

Of course one or more control parameters may be modified during operation of the cell.

The present invention also discloses a method of optimization of a PEM fuel or electrolysis cell, characterized in that it comprises following steps:

experimental analysis of local current density and electrochemical impedance distribution of the cell to be optimized accordingly to the invention, performed during reference condition operation, over a testing period long enough to evaluate the occurring degradation mechanisms, determining current density redistribution, identifying the most critical areas of the cell.

characterization of local current density and electrochemical impedance distribution of the cell to be optimized accordingly to the invention, performed during steady state analysis varying a selection of the most influencing operation control parameters, in order to evaluate the influence of such variations on local operation—development of improved components having gradients in properties, basing the development on the former investigations, developing altogether a draft operating strategy for the optimized component, in order to locally contrast the formerly identified limiting mechanisms, said development being based on modelling of the improvements to simulate their impact on local performance, optimizing local material properties and operating conditions analysis of local current density and electrochemical impedance distribution of the cell comprising the optimized components with properties gradient and definition of the corresponding optimized operating protocol aiming to the maximum uniformity in current density distribution over the cell active area during long term cell operation.

To reach the required electrical power a PEM cell according to the present invention may be a modular cell assembled in stack of cell units electrically connected in series, and optimization may be different for different cell units constituting the stack.

BRIEF DESCRIPTION OF THE DRAWINGS

Additional features and advantages of the invention will become more apparent from the description of a preferred, but not exclusive, embodiment of the PEM fuel or electrolysis cell according to the invention, illustrated by way of non-limiting example in the appended drawings, in which.

DETAILED DESCRIPTION

Figure 7:
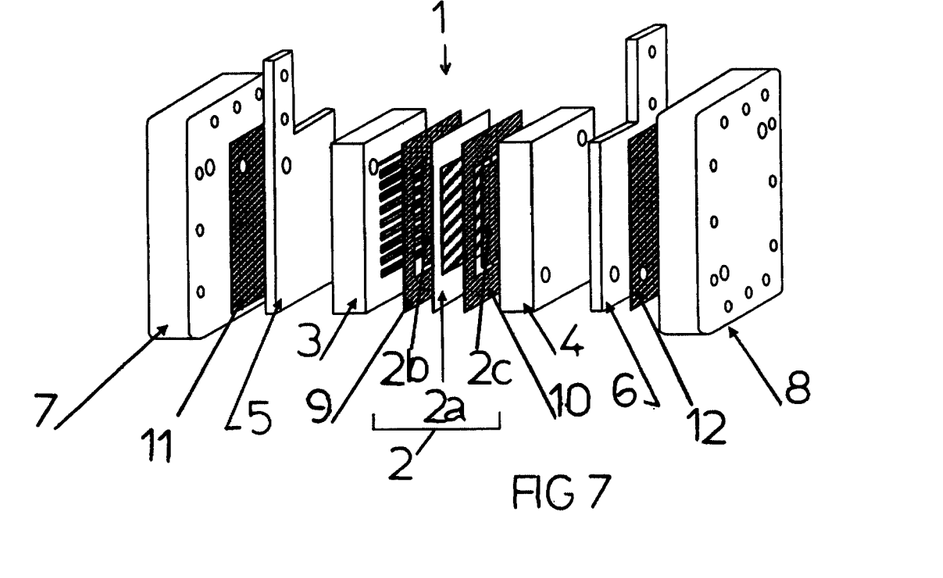
FIG. 7 shows an exploded view of a PEM fuel cell according to an embodiment of the present invention.

As it can be seen in FIG. 7, the fuel cell 1 comprises a membrane electrode assembly 2 (MEA), a reactant supply circuit having a reactant inlet and a reactant outlet, and an oxidant supply having an oxidant inlet and an oxidant outlet.

Reactant supply circuit and oxidant supply circuits are formed by an anode side and respectively a cathode side flow plate 3, 4.

Each flow plate 3, 4 comprises one or more flow channels, for reactant and/or oxidant and/or coolant circuits.

Flow plates 3, 4 are sandwiched between an anode side and a cathode side current collector 5, 6 in turn sandwiched between an anode side and a cathode side clamping plate 7, 8.

Gaskets 9, 10 are foreseen between the membrane electrode assembly 2 and each flow plate 3, 4. Gaskets 9, 10 prevent the reactant gas from leaking out of the cell 1.

An electrical insulation sheet 11, 12 is located between each current collector 5, 6 and the corresponding clamping plate 7, 8.

The membrane electrode assembly 2 consists of an electrolyte membrane 2a coated with an anode side and a cathode side catalyst layer (CCM), and anode side and cathode side gas diffusion layer 2b, 2c (GDL) each coating the respective catalyst layer.

Anode and respectively cathode gas diffusion electrode is formed by gas diffusion layer 2b, 2c and the corresponding catalyst layer.

Gas diffusion layer 2b, 2c serves as electric contact and allows the access of reactants to the catalyst layer and the removal of reaction products.

Advantageously fuel cell 1 further comprises tuning means adapted to modify at least one control parameter of the cell during operation of the cell.

Tuning means (not shown) may comprise a programmable electronic control unit controlling parameters of reactant and/or oxidant circuits.

Programmable electronic control unit may control either a flow rate regulator (i.e. an interception valve) of reactant and/or oxidant, and/or a temperature regulator of reactant and/or oxidant, and/or a humidity regulator of reactant and/or oxidant, and/or a temperature regulator of the cell, and so on.

As an illustrative but not exclusive illustration of the invention, its application to direct methanol fuel cell (DMFC) technology is hereby explained.

Reference is made first to a traditional PEM fuel cell, for instance an active air fed DMFC, where no gradient in properties of components of the membrane electrode assembly is foreseen. The direct methanol PEM fuel cell used for this illustration of the invention is operated with stoichiometries at anode and cathode equal respectively to 6 and 3 at 0.25 A cm$^{-2}$, which is the nominal current density. Methanol concentration fed at anode side is 1 M, while air feed at cathode is fully humidified at ambient temperature; the PEM cell is operated at 75° C. The flow pattern of distributors is triple serpentine and electrodes catalyst loading is 1.8 mg (PtRu) cm-2 and 1.2 mg (Pt) cm$^{-2}$ respectively at anode and cathode. The setup being used is a custom developed macro-segmented fuel cell, able to permit the local characterization of the operating cell locally focusing on four macro-areas of the PEM cell (inlet: CAT1, inlet-center: CAT2, outlet-center: CAT3, outlet: CAT4, with respect of air feed direction).

Figure 1A:
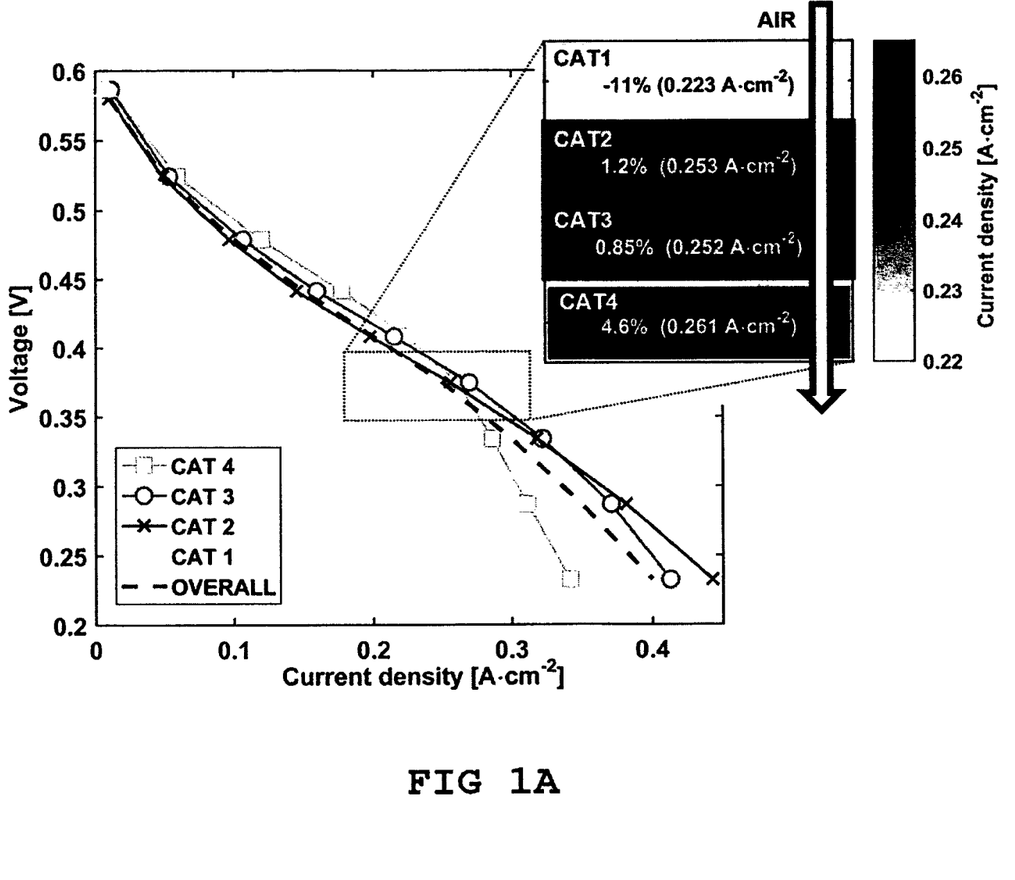
FIG. 1A shows local polarization curves measurement of a traditional cell, detailing the current density distribution in four macro-areas of the cell (inlet: CAT1, inlet-center: CAT2, outlet-center: CAT3, outlet: CAT4, with respect of air feed direction) at nominal current density (0.25 A $cm^{-2}$)

From local polarization curves measurement, reported in FIG. 1A, and the respective electrochemical impedance spectroscopy analyses (EIS) performed both at low (0.1 A cm*$^{-2}$) and nominal current densities (0.25 A cm$^{-2}$, reported in FIG. 1B), it is clearly noticeable how performance is actually unevenly distributed over cell active surface area, even in reference operating conditions. A detail of the current density distribution at reference current density is reported in the detail of FIG. 1A, highlighting a sensibly uneven distribution of performance (A/i=15.2%).

Particularly interesting seems the low performance supplied by air-inlet area of the cell (FIGS. 1A and 1B "CAT1", triangle symbols), which seems to be related to the dry air feeding dehydrating effect (typically, in DMFC air feed RH is low due to the high liquid water content present at anode side). Polymer dehydration, both contained in the catalyst layer (CL) and constituting the electrolyte membrane, increases proton transport resistance determining a localized increase in ohmic and kinetic losses.

Figure 1B:
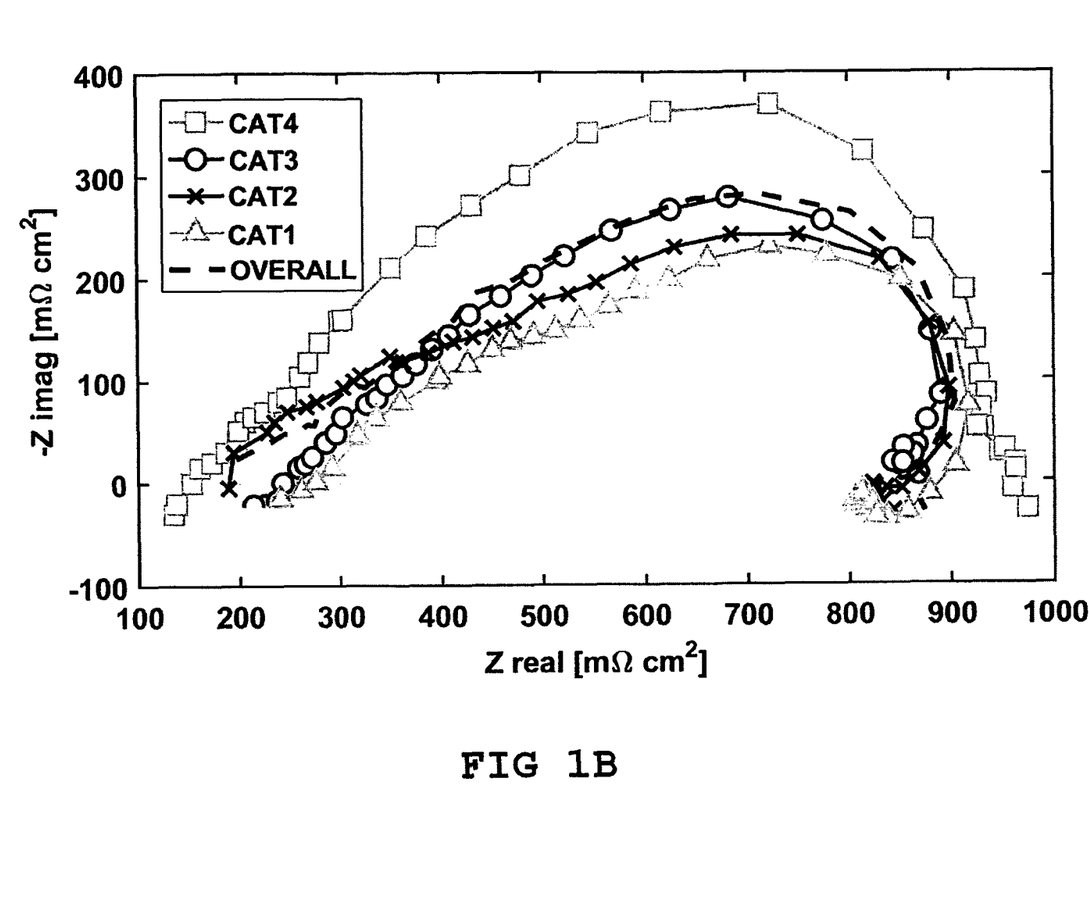
FIG. 1B show the local electrochemical impedance spectroscopy analysis (local EIS) performed at nominal current densities (0.25 A $cm^{-2}$) for a traditional cell, distinguishing the contribution of said four macro-areas of the cell.

This effect is noticeable in the higher slope of air-inlet polarization curve (FIG. 1A "CAT1", triangle symbols) and in the higher value of high frequency resistance (HFR) of the air-inlet impedance spectrum (FIG. 1B "CAT1", triangle symbols) that shows a 150% value than that of air-outlet area (FIG. 1B "CAT4", square symbols).

On the contrary, air-outlet area performance (FIGS. 1A and 1B "CAT4", square symbols) seems limited at high current density in the polarization curve, showing mass-transport related EIS disturbance at low frequency that, together with the lowest HFR between all the cell segments (150 mOhm cm$^{-2}$), points out the limitations as most likely due to a liquid water excess. This determines an incipient flooding condition that limits the proper diffusion of oxygen (already low in partial pressure, due to its previous consumption occurring in the preceding segments) towards electrode's active sites, showing up with noticeable concentration losses at reference current density (0.25 A cm$^{-2}$).

Increasing cathode stoichiometry increases oxygen partial pressure and water removal rate at cathode outlet, actually determining a strong performance gain at cathode outlet, but at the same time leads to a decrease of performance at cathode inlet, due to the stronger dehydrating effect determined by the dry-air feed mass flow increase. The opposite effect occurs when increasing air feed saturation, favoring the operation of the de-hydration limited air-inlet area, but at the same time increasing flooding-related losses at air-outlet area.

A homogenization of performance distribution over the cell active area appears thus as not possible through just an optimization of the operating conditions, whose only effect seems to move the limitation over cell active surface, always having areas operating in non-optimal conditions.

Figure 2A:
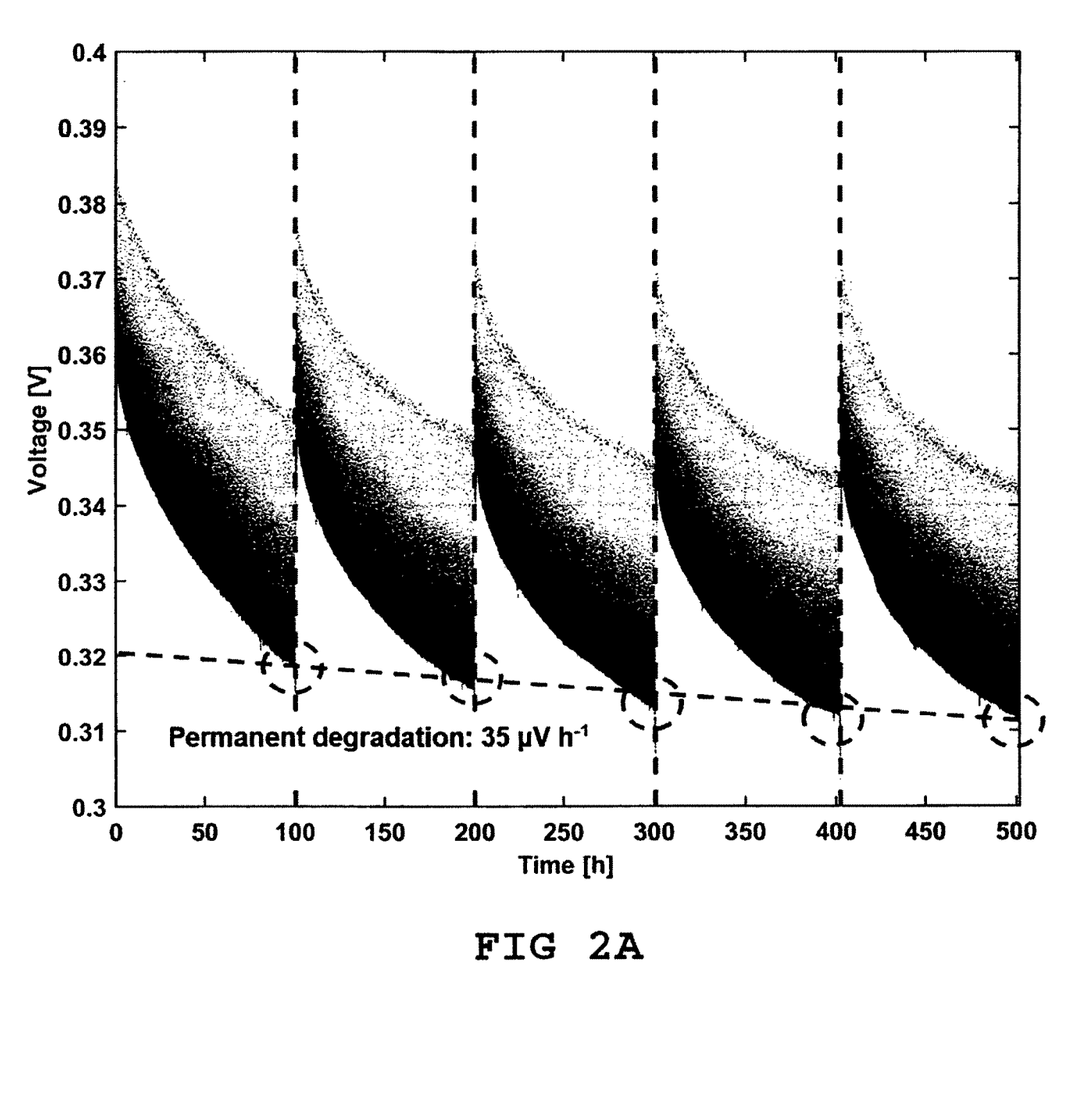
FIGS. 2A and 2B show the trend of both cell voltage (2A), together with the corresponding permanent degradation rate, and current density distribution (2B), distinguishing the contribution of said four macro-areas of the cell, during a 500 h operational test for a traditional cell.
Figure 2B:
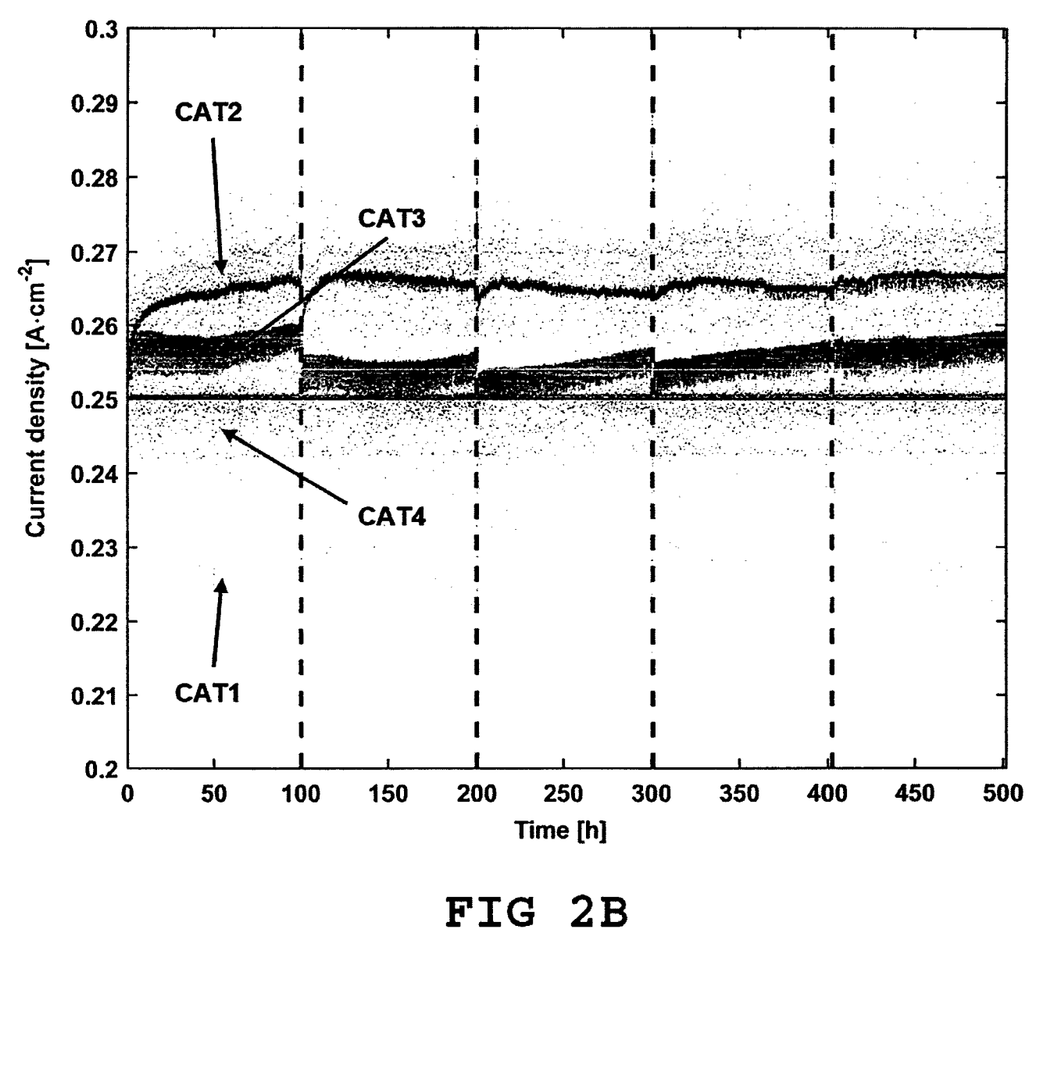

These limiting effects on the polarization show up to increase in magnitude during actual cell operation, as shown in FIGS. 2A and 2B, where the trend of both cell voltage and current density distribution during a 500 h overall-galvanostatic (0.25 A cm$^2$) operational test are reported.

Figure 3A:
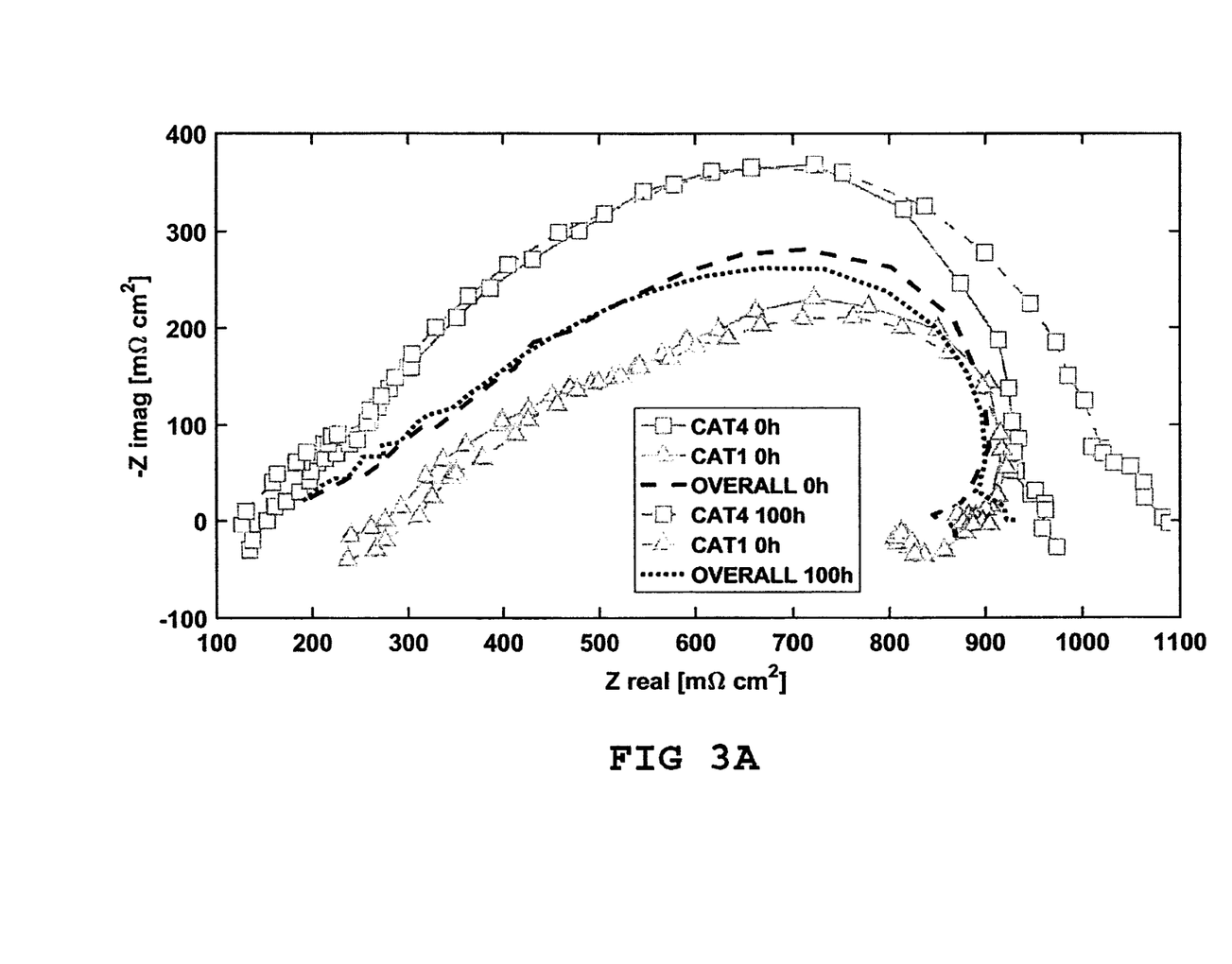
FIG. 3A shows a comparison between local EIS relative to inlet and outlet macro-areas before and after 100 h of the operational test reported in FIGS. 2A and 2B.
Figure 3B:
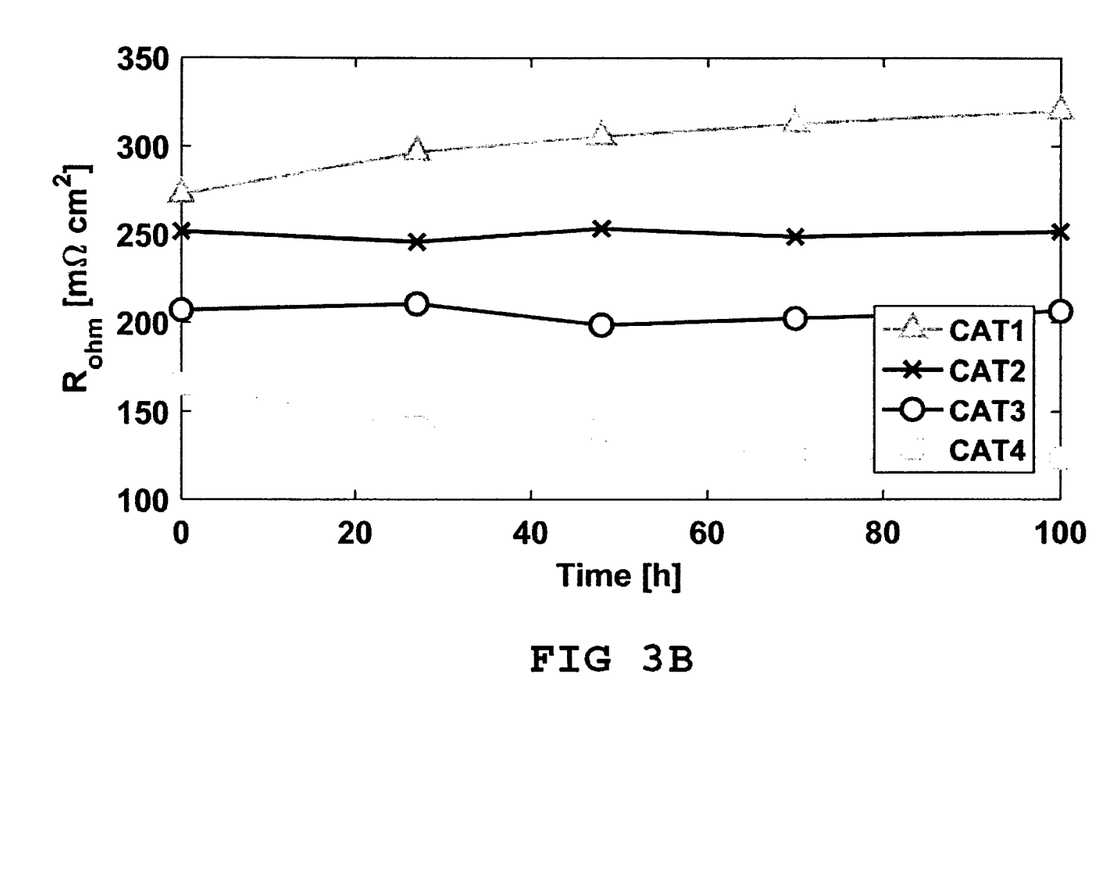
FIG. 3B shows the HFRs trend in time during the operation of a traditional cell obtained from the local EIS, distinguishing the contribution of said four macro-areas of the cell, during 100 h of the operational test reported in FIGS. 2A and 2B.
Figure 4:
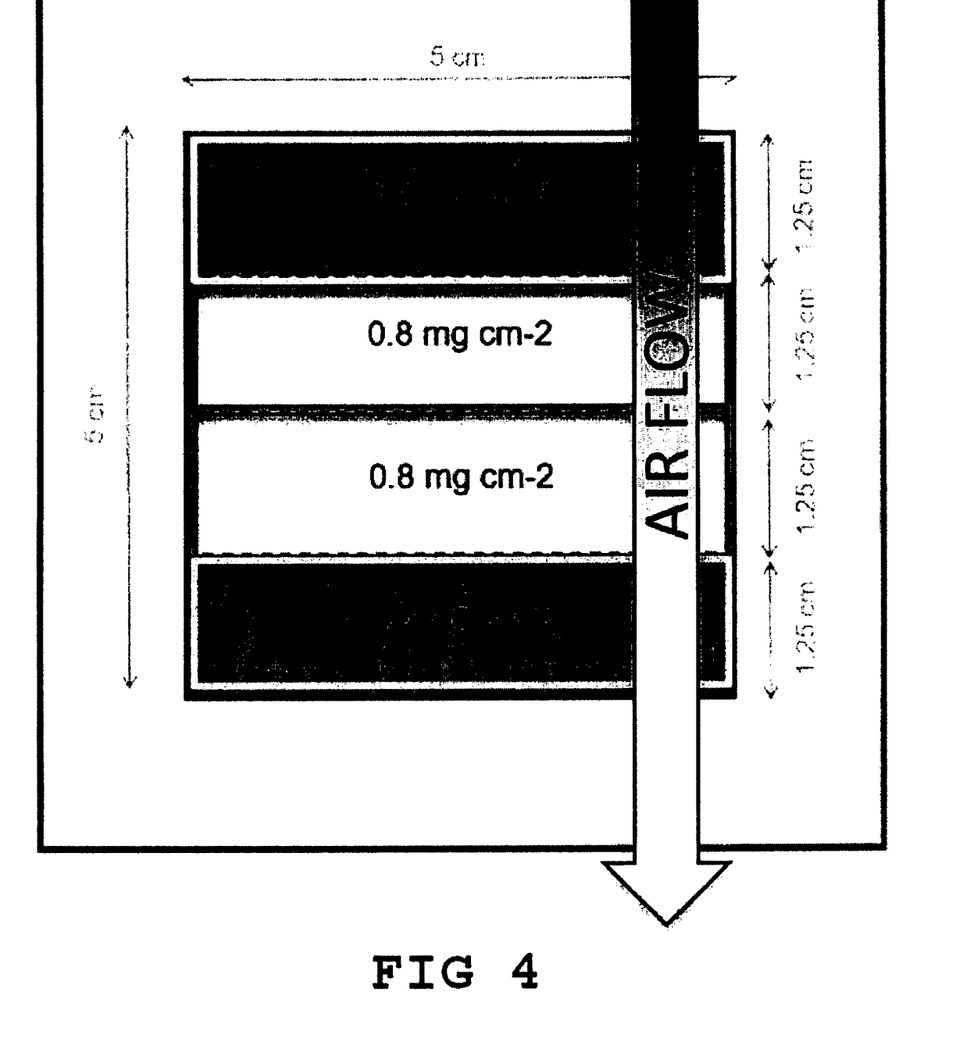
FIG. 4 shows catalyst loading distribution of a cell according to an embodiment of the present invention.

It is indeed clear how current density supplied by the air-inlet area (FIG. 2B "CAT1") tends to lose more than 5% performance in just 100 h of uninterrupted operation, forcing the areas operating in optimized conditions to compensate for its loss, in order to ensure the overall current drawn from the cell itself. This is clearly noticeable comparing EIS relative to inlet (FIG. 3A "CAT1", triangle symbols) and outlet area (FIG. 3 A "CAT4", square symbols) before and after 100 h of operation, where the areas appear to be limited respectively by dehydration and mass transport issues. Analyzing the HFRs trend obtained from the local EIS in time during the operation in FIG. 3B, it appears clearly how the performance loss of air-inlet segment (FIG. 3B "CAT1", triangle symbols) seems to be related to its dehydrated state, already discussed, that tends to worsen in time, oppositely to the behavior of air-outlet area (FIG. 3B "CAT4", square symbols) that points out a probable water excess.

Thus, such a performance redistribution during uninterrupted operation determines in traditional uniform components a localized decrease of current supplied from the inlet and outlet areas of the cell. This, for the abovementioned mechanisms, tend to determine an uneven development of aging mechanisms, leading to an earlier deactivation of the overall device if compared to that achievable with a more homogenous ageing over the cell active surface.

We refer now to a PEM fuel cell according to an embodiment of the present invention.

The application of the invention to the above example leads to the use of a parabolic loading in catalyst loading, with the aim of promoting operation of air-inlet and air-outlet areas, that would work in non-optimized conditions in the above said traditional fuel cell. Oppositely, catalyst loading of the central areas of the cell has to be decreased, in order to maintain the overall loading, being already the highest current density supplying areas of the cell. Also assisted by the use of physical modelling simulation to estimate the optimal local loading able to ensure a homogeneous performance, distribution has been locally tuned increasing by 40% (1.6 mg cm") catalyst and ionomer loading of air-inlet and air-outlet of the cell, reducing it by 40% in the central area (0.8 mg cm$^{-2}$), Proportionally, also the loading of ionomer and carbon support have been varied, in order to effectively contrast limitation related on proton transport and dehydration. In this way, no change in the overall catalyst loading (1.2 mg cm$^{-2}$) of the sample have been determined from the reference component.

Figure 5A:
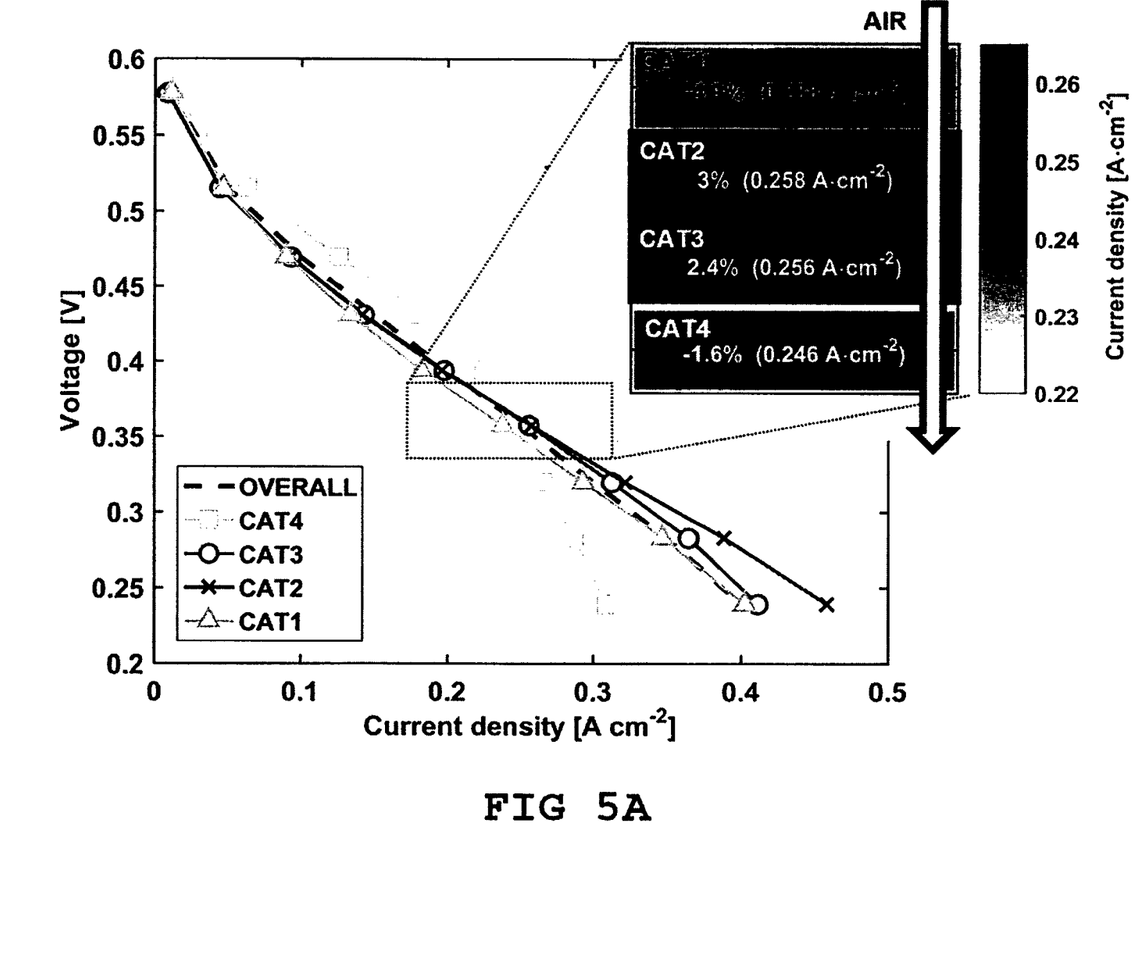
FIG. 5A show local polarization curves of a cell according to an embodiment of the present invention, detailing the current density distribution of said four macro-areas of the cell at nominal current density (0.25 A $cm^{-2}$)

From the analysis of the local polarization curves (FIGS. 5A and 5B) it is clear how the tuning of local catalyst and ionomer loading actually enables the ability to control the redistribution of local current density supplied by the device. This leads to an improved performance localized in the previously limited areas (air inlet and outlet), determining a more homogenous performance distribution ($\Delta i_{max}/i=8\%$) if compared to that of the non-locally optimized component (FIG. 1A).

Indeed, current density distribution becomes tunable over cell's active surface through operating condition optimization: increasing current density supplied from air-inlet area obtained through the increase of local catalyst loading, promotes self-hydration mechanism as well as localized oxygen consumption. This, without any optimization of operating conditions, would lead to a performance decrease in air-outlet area, because of its consequent operation with a lower oxygen and higher water contents in reactant feed if compared to that of the traditional component.

Figure 5B:
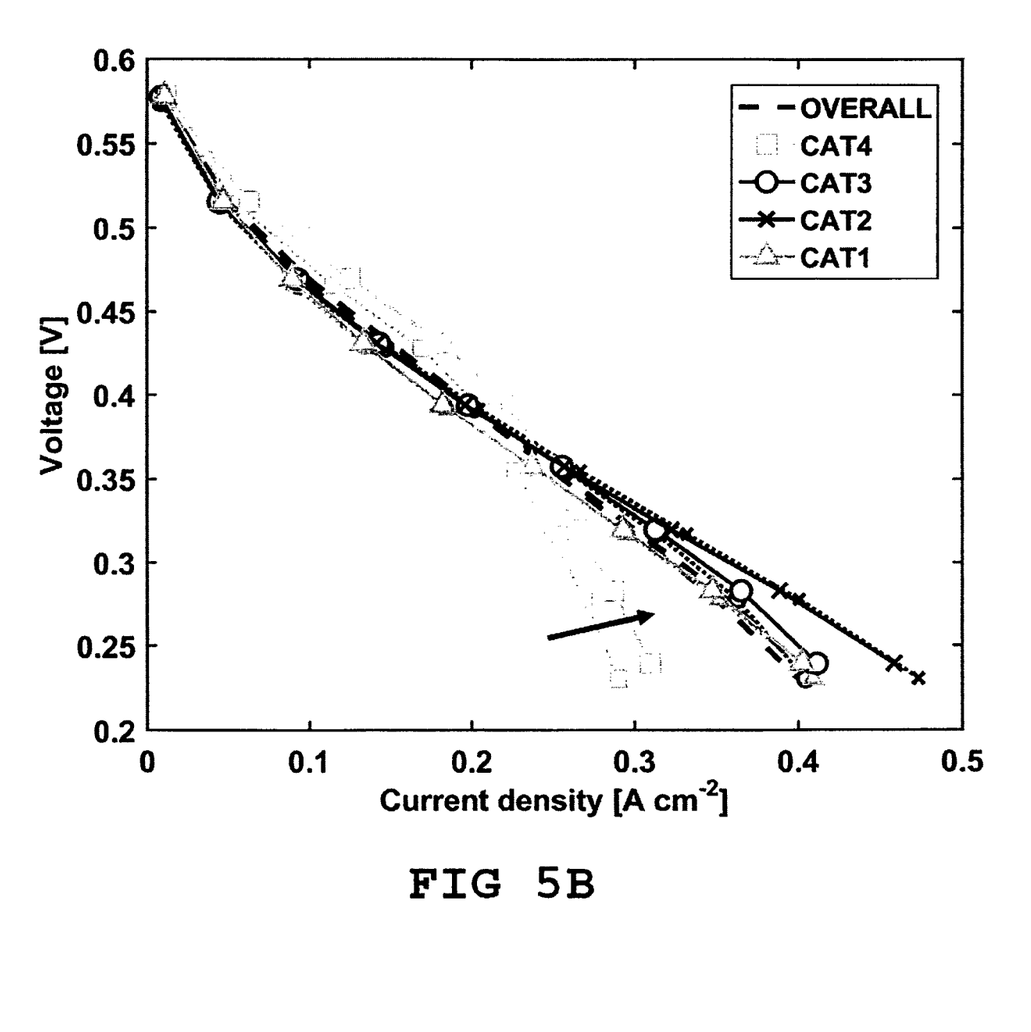
FIG. 5B show the effect of increasing oxidant flow rate, according to an embodiment of the present invention, on the component reported in FIG. 4.
Figure 6:
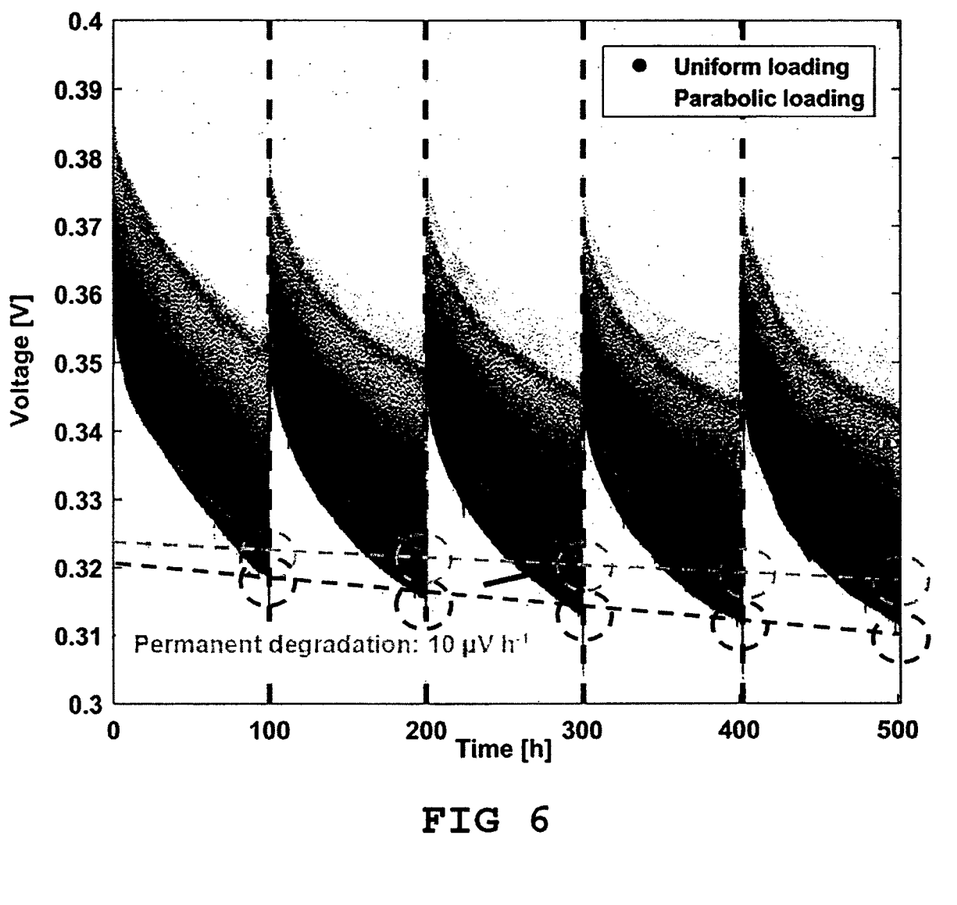
FIG. 6 shows a comparison between the trend of cell voltage during a 500 h operational test for a traditional cell (as reported in FIG. 2A) and a cell according to an embodiment of the present invention, together with the corresponding permanent degradation rate.

The possibility to slightly increase cathode stoichiometry (acting on air mass flow) without determining any increase of dehydration losses at air-inlet (as it is in the traditional component), permits to actively tune the contribution of cell's air-outlet area to the overall performance by increasing its local current density (FIG. 5B "CAT4", square symbols). On the contrary, the increased catalyst and ionomer loading of the air-inlet area, that enhances localized current density supply (favoring the self-hydration), indeed, permits to an increase of air mass flow not too determine any loss in local performance (FIG. 5B "CAT1", triangle symbols) due to increased dehydrating effect from the dry air itself (as it happens in the traditional component). The effect of such an improvement are clearly noticeable applying it to actual device operation, combining the optimized component together with the optimized operating protocol. The operating conditions have been periodically adapted in order to ensure the highest level of homogeneity of the current density during the operation, actively contrasting its discussed tendency to increase in time, thus avoiding the shrinking of cell's active domain. They are tuned with slight increases of cathode stoichiometry depending on the measured redistribution (moving from $\lambda o=3.25$ during the first 100 h to $\lambda o=3.5$ from 200 h on), in FIG. 6, where 500 h of overall galvanostatic (0.25 A cm$^{-2}$) optimized operation are reported for the cell comprising the optimized component, together for comparison with that of FIG. 2A for the traditional component and operating protocol.

Performance distribution so obtained is sensibly more homogenous if compared to that of traditional devices. The effect on performance degradation is sensibly noticeable, leading from the degradation value of the reference component being 35µv h$^{-1}$, to less than 10µv h$^{-1}$ in the optimized component operated through the optimized protocol, determining a reduction of permanent performance degradation by over 70% on a 500 h basis as reported in FIG. 6.

The PEM fuel or electrolysis cell thus conceived is susceptible of numerous modifications and variants, all falling within the scope of the inventive concept; moreover, all the details are replaceable by technically equivalent elements.

The materials used, as well as the dimensions, may in practice be of any type, according to needs and the state of the art.

More generally, components of the membrane electrode assembly whose properties are subjected to a gradient may be cathode side and/or anode side components and in particular at least one catalyst layer and/or at least one gas diffusion layer.

A gradient may be applied to catalyst loading per unit of surface of at least one catalyst layer and/or to ionomer loading per unit of surface of at least one catalyst layer and/or to thickness of at least one catalyst layer, and/or to hydrophobicity of at least one gas diffusion layer. Control parameters are tuned by tuning means as a function of the selected gradient of every property of every component of the membrane electrode assembly.

In general tuned control parameters may be flow rate, temperature, relative humidity or pressure of the reactant and/or of the oxidant.

The invention claimed is:

1. A PEM fuel or electrolysis cell comprising:
   a reactant supply circuit comprising:
      a reactant inlet and a reactant outlet, an oxidant supply circuit comprising an oxidant inlet and an oxidant outlet, a cooling circuit comprising a coolant inlet and a coolant outlet, and a membrane electrode assembly, said membrane electrode assembly comprising an electrolyte membrane coated with an anode side and a cathode side catalyst layer and an anode side and a cathode side gas diffusion layer each coating the respective catalyst layer, wherein said membrane electrode assembly further comprises:
         a gradient comprising a gradient of catalyst loading per unit of surface of at least one of the anode side or the cathode side catalyst layer, the respective catalyst layer being provided with a parabolic loading in catalyst loading that promotes operation of oxidant-inlet and oxidant-outlet areas and oppositely decreases catalyst loading of central areas of the cell; and
         a tuner modifying at least one control parameter of the cell during operation of the cell.

2. The PEM fuel or electrolysis cell according to claim 1, wherein said gradient is a gradient of ionomer loading per unit of surface of at least one catalyst layer.

3. The PEM fuel or electrolysis cell according to claim 1, wherein said gradient is a gradient of thickness of at least one catalyst layer.

4. The PEM fuel or electrolysis cell according to claim 1, further comprising a gradient of a gas diffusion layer.

5. The PEM fuel or electrolysis cell according to claim 1, further comprising a gradient of hydrophobicity of at least one gas diffusion layer.

6. The PEM fuel or electrolysis cell according to claim 1, wherein said gradient is a gradient of the anode side catalyst layer.

7. The PEM fuel or electrolysis cell according to claim 1, wherein said gradient is a gradient of the cathode side catalyst layer.

8. The PEM fuel or electrolysis cell according to claim 1, wherein said control parameter is a flow rate, temperature, relative humidity or pressure of the reactant.

9. The PEM fuel or electrolysis cell according to claim 1, wherein a flow rate is gradually increased during operation of the cell.

10. The PEM fuel or electrolysis cell according to claim 1, wherein said control parameter is an average working temperature of the cell or a flow rate or an inlet temperature of coolant.

11. The PEM fuel or electrolysis cell according to claim 1, wherein said tuner comprises a programmable electronic control unit controlling parameters of reactant and/or oxidant circuit and/or the cell as a function of the gradient.

12. A method of optimization of a PEM fuel or electrolysis cell, comprising:

characterizing current density distribution and local electrochemical impedance analysis of the cell performed during a reference condition operation over a testing period, a duration of the testing period being sufficient to appreciate one or more degradation mechanisms hindering local performances;

identifying limited areas of a cell;

characterizing current density distribution and local electrochemical impedance analysis of the cell performed during steady state analysis by varying a selection of operation control parameters to evaluate an influence of variations of the selection on local operation;

developing components having gradients in properties, based on modeling of improvements to simulate their impact on local performance, by optimizing local material properties and operating conditions of the components; and characterizing current density distribution and local electrochemical impedance analysis of the cell, including the components with gradient in properties; and defining a corresponding optimized operating protocol to achieve uniformity in current density distribution over an active area of the cell during cell operation.

13. The method of optimization of a PEM fuel or electrolysis cell according to claim 12, wherein a segmented cell is used for said characterization.

* * * * *